US008631693B2

(12) United States Patent
Johnson et al.

(10) Patent No.: US 8,631,693 B2
(45) Date of Patent: Jan. 21, 2014

(54) WHEEL SLIP SIMULATION SYSTEMS AND METHODS

(75) Inventors: Donald Bryce Johnson, Algonac, MI (US); Norman Malcolm Newberger, White Lake, MI (US); Isaac Cohen Anselmo, Livonia, MI (US)

(73) Assignee: Horiba Instruments, Inc., Irvine, CA (US)

( * ) Notice: Subject to any disclaimer, the term of this patent is extended or adjusted under 35 U.S.C. 154(b) by 152 days.

(21) Appl. No.: 12/977,375

(22) Filed: Dec. 23, 2010

(65) Prior Publication Data

US 2012/0166154 A1 Jun. 28, 2012

(51) Int. Cl.
*G01M 17/00* (2006.01)

(52) U.S. Cl.
USPC ..................................... 73/116.05; 73/116.06

(58) Field of Classification Search
USPC .......................................... 73/116.05, 116.06
See application file for complete search history.

(56) References Cited

U.S. PATENT DOCUMENTS

| 3,905,225 | A | * | 9/1975 | Moss et al. ................. 73/116.06 |
| 4,939,985 | A | | 7/1990 | Von Thun |
| 5,109,696 | A | * | 5/1992 | Bright et al. ............... 73/115.02 |
| 5,144,834 | A | * | 9/1992 | Sano et al. ................. 73/115.02 |
| 5,323,644 | A | * | 6/1994 | Schaefer ..................... 73/118.01 |
| 5,339,682 | A | * | 8/1994 | Watanabe et al. ............... 73/123 |
| 5,621,168 | A | | 4/1997 | Kim et al. |
| 6,634,218 | B1 | | 10/2003 | Nakanishi et al. |
| 6,754,615 | B1 | * | 6/2004 | Germann et al. ................. 703/8 |
| 7,104,118 | B2 | * | 9/2006 | Tentrup et al. ............. 73/116.06 |
| 7,117,730 | B2 | * | 10/2006 | Karrer et al. ..................... 73/123 |
| 7,680,639 | B2 | * | 3/2010 | Schoeggl ........................... 703/8 |
| 7,712,358 | B2 | * | 5/2010 | Kingsbury et al. ........ 73/115.06 |
| 7,908,916 | B2 | * | 3/2011 | Jenniges et al. ................ 73/146 |
| 8,001,835 | B2 | * | 8/2011 | Engstrom ................. 73/116.06 |
| 8,170,768 | B2 | * | 5/2012 | Fujimoto et al. ................ 701/90 |
| 2007/0240517 | A1 | * | 10/2007 | Kingsbury et al. ............. 73/760 |
| 2009/0126510 | A1 | * | 5/2009 | Engstrom ................. 73/862.14 |
| 2009/0210128 | A1 | * | 8/2009 | Fujimoto et al. ................ 701/84 |
| 2009/0301183 | A1 | * | 12/2009 | Jenniges et al. ................ 73/146 |

FOREIGN PATENT DOCUMENTS

EP 0338373 A2 10/1989

OTHER PUBLICATIONS

Bryce Johnson, Engine, Battery and Vehicle Simulation Strategies for Transmission Testing, Proceedings of the 2009 Ground Vehicle Systems Engineering and Technology Symposium, Horiba Instruments, Troy, Michigan, 14 pgs.
International Search Report and Written Opinion of the International Searching Authority, dated May 1, 2012 for Application No. PCT/US2011/066782, filed Dec. 22, 2011, 11 pgs.

* cited by examiner

*Primary Examiner* — Freddie Kirkland, III
(74) *Attorney, Agent, or Firm* — Brooks Kushman P.C.

(57) ABSTRACT

A dynamometer may be configured to simulate the rotating inertial characteristics of a wheel-tire assembly slipping relative to a road surface and having rotating inertial characteristics different than the rotating inertial characteristics of the wheel-tire assembly being simulated.

8 Claims, 4 Drawing Sheets

WHEEL SLIP SIMULATION SYSTEMS AND METHODS

BACKGROUND

Test stands may be used to test the powertrain of a vehicle by simulating the rolling resistance of the wheels and the acceleration performance of the vehicle by way of electric load machines mounted on the drive shafts.

SUMMARY

A controller may be configured to receive speed and torque information about a dynamometer simulating a wheel-tire assembly slipping relative to a road surface. The controller may be further configured to determine a desired speed of the simulated wheel-tire assembly based on the torque information, and to generate a demand for the dynamometer based on the speed information and the desired speed to cause the dynamometer to exhibit desired rotating inertial characteristics.

DETAILED DESCRIPTION

Figure 1:
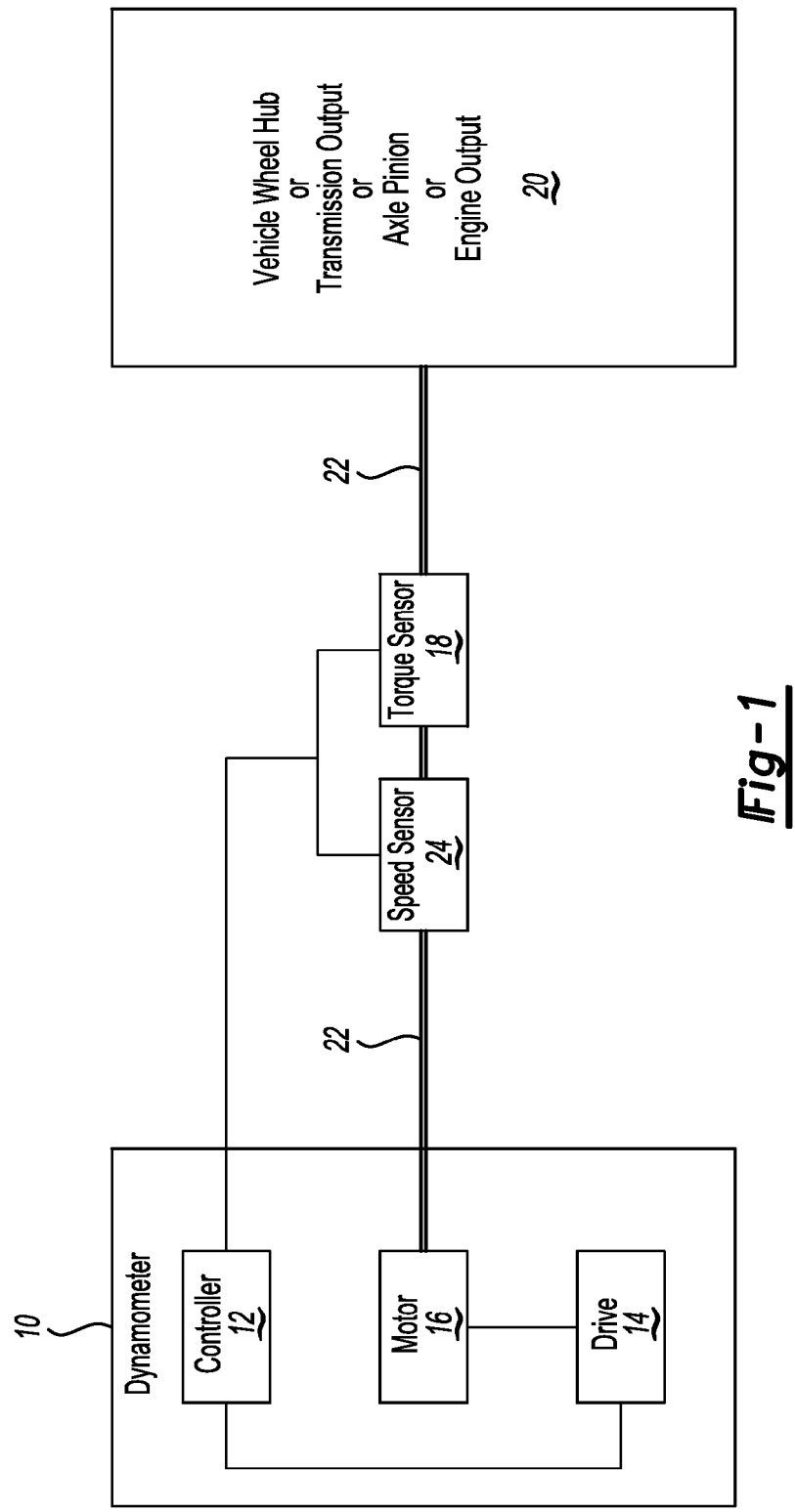
FIG. 1 is a block diagram of a test stand for a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Dynamometers used as loading units on powertrain test stands may have a relatively large inertia (e.g., 5 to 10 kgm$^2$). So called high inertia, low dynamic dynamometers are commonplace in industry. These dynamometers replace a relatively small inertia (e.g., 1 kgm$^2$) when simulating, for example, a tire and wheel assembly. Proper wheel slip simulation, however, requires the inertia seen by the vehicle to be the same as the tire and wheel assembly being simulated in order to reproduce driveline natural frequency, wheel force, axle torque, speeds, damping and amplitudes. (The terms wheel slip and tire slip are used interchangeably herein.) Proper wheel and tire inertia may be needed to ensure that the driveline natural frequency is correct. In conjunction with inertia, damping caused by tire and driveline properties determines damping of the natural frequency. A tire model may ensure that proper tire forces are generated. Proper simulation of wheel slip may require proper tire force, tire and wheel inertia (or simulation thereof) and damping of the resulting natural frequency.

Certain conventional wheel slip simulation techniques require the use of low inertia, high dynamic dynamometers as high inertia, low dynamic dynamometers may not accelerate and/or decelerate quickly enough for wheel slip simulation during a wheel spin event. Low inertia, high dynamic dynamometers, however, may be relatively expensive and less commonly available. It may therefore be desirable to use high inertia, low dynamic dynamometers to execute wheel slip algorithms. Certain techniques/systems/algorithms contemplated herein permit the use of high inertia dynamometers for wheel slip simulation.

Conventional wheel slip simulation techniques may allow dynamometer speed and torque control loss during a slip event to prompt the dynamometer inertia to behave in the same way as the inertia of the tire and wheel assembly being simulated. (This effective loss of control may occur when the vehicle torque exceeds the torque reacted by the simulated tire forces or when the vehicle torque exceeds the clamping torque imposed on the drive demand.) Dynamometer speed control loss during slip events requires the actual inertia of the dynamometer to equal the inertia of the tire and wheel assembly being simulated if proper driveline natural frequency is to reveal itself. Issues may arise, however, because the spring and damping characteristics of the tire may not be properly simulated. Although some adjustability of damping may be achieved by way of a compensator, this compensator may not permit control or adjustability of the natural frequency. Certain embodiments disclosed herein may retain dynamometer speed control during slip events. Hence, control and adjustability of driveline natural frequency and damping thereof may be achieved.

It may be difficult in conventional wheel slip simulation techniques to impart different speeds to different wheels to simulate turning or negotiating a curve. A lateral-longitudinal-Pacejka model with steering angle, for example, may be used to determine wheel speeds. (Any suitable/known tire model, however, may be used.) The Pacejka model, however, is complex and parameters may be unavailable. Kinematic calculation of gains that form slip control, for example, may be difficult. Certain embodiments contemplated herein may apply delta speeds to mimic steering input to the vehicle speed, simplifying the steering calculation to a kinematic calculation.

Referring to FIG. 1, a dynamometer 10 may include a controller 12, drive 14 and motor 16. The drive 14 is in communication with/under the control of the controller 12 and drives the motor 16. A torque sensor 18 may be mechanically connected between the motor 16 and a vehicle drivetrain 20 via shafting 22. The torque sensor 18 may be in communication with the controller 12. A speed sensor 24 for the dynamometer 10 may be mechanically connected to either side of the motor 16. This sensor 24 may be used for speed control of the motor 16. The torque measurement from the torque sensor 18 represents the torque created by tire forces (e.g., forces transmitted between the tire and road surface) according to the tire simulation 30. The torque measurement includes the force accelerating the inertia of the simulated tire and wheel inertia (Measured Torque=Tire Force*Tire Radius+Tire Acceleration*Tire and Wheel Inertia, where Tire Radius and Tire and Wheel Inertia (desired rotating inertial characteristics) are given and Tire Acceleration is derived from simulated tire speed). The tire simulation 30 separates these forces to calculate the tire force and the slip speed (e.g., the speed difference between the tire and the road). These simulated forces (tire force and tire acceleration force) are equal to the dynamometer force generated by the motor 16 plus the accelerating force on the inertia of the motor 16.

The rotating inertia of the motor 16 in combination with the rotating inertia of the sensors 18, 24 and shafting 22 forms the rotating inertia of the test stand. This rotating inertia should be compensated for if it is not the same as the rotating inertia of the components being simulated. (That is, if it is not the same as the rotating inertia of the components removed from the vehicle.) As explained below, the controller 12 may control the drive 14/motor 16 such that the rotating inertia of the test stand mimics the rotating inertia of, for example, a slipping wheel and tire assembly (other components, of course, may be simulated). The demand signal (demand) to the drive 14 is typically a torque demand as is typical for most dynamometer test stands. Alternatively, the demand may be a current (Amps) request to the drive 14, etc.

While FIG. 1 only shows a single dynamometer configuration for a single input to the vehicle drivetrain 20, it is understood that such a configuration could be attached to each of the wheel hubs on a vehicle that contains any number of wheels (e.g., 10 wheels).

Figure 2:
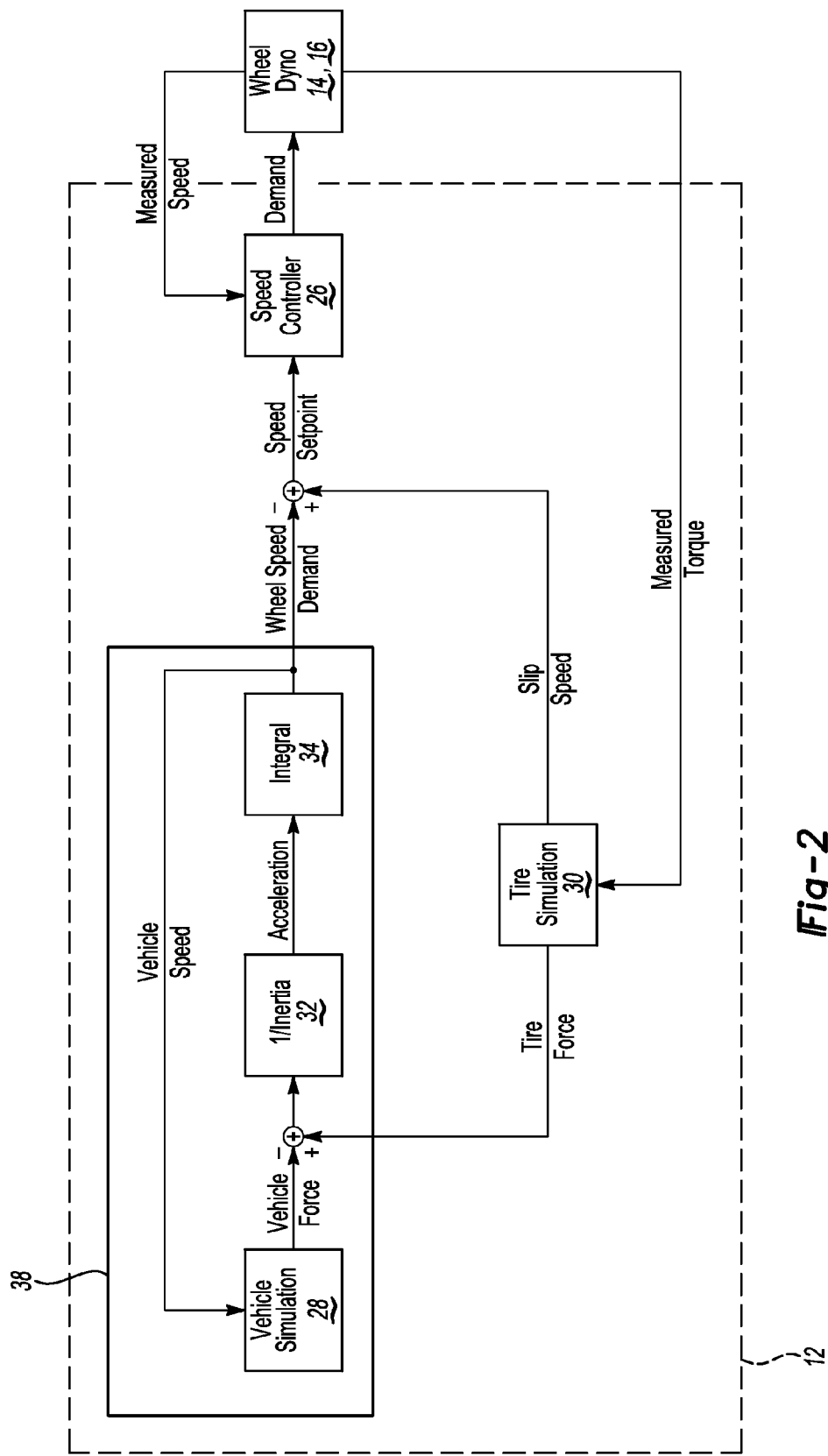
FIG. 2 is a block diagram illustrating the dynamometer controller, drive and motor of FIG. 1.

Referring to FIG. 2, the drive 14 and motor 16 may be controlled with a speed feedback loop by a speed controller 26. The setpoint of the speed controller 26 (desired speed) is the wheel speed that is calculated by the sum of the slip speed and the vehicle speed (for that tire). Such speed control may provide a means for inertial simulation. High dynamic events, however, may require a feedforward element in the speed controller 26 to provide high bandwidth response to changes in the slip. This feedforward element may also provide the means for inertial simulation, and therefore control of driveline natural frequency. Increasing the gain of the feedforward element decreases the effective inertia, resulting in higher driveline natural frequency. Reducing the feedforward gain increases the effective inertia, resulting in lower driveline natural frequency. Damping may effectively be controlled by proportional and derivative elements in the speed loop.

The vehicle speed may result from calculations based on well known road load equations in a vehicle simulation 28 combined with tire forces calculated in a tire simulation 30, resulting in a force that, when operating on a vehicle inertia 32, results in an acceleration of the vehicle that, when integrated 34, yields vehicle speed. The blocks 28, 32, 34 may be combined to create the well known road load calculation block 38. Such calculations may include, but are not limited to, additional well known calculations such as incline, wind speed and braking calculations. The tire force represents the force accelerating the vehicle and the vehicle force represents forces resisting the acceleration. Hence, the speed controller 26 need not be disabled during any slip events in this particular application of speed control for wheel slip simulation.

The tire simulation 30 may use a variety of tire models (e.g., a Pacejka longitudinal tire model, a simplified tire model, etc.) In certain implementations, an iterative algorithm may used to solve for slip from a function whose independent variable is slip. As an example, the Pacejka equation describes the tire force as a function of slip. Circumstances may dictate, however, that slip be calculated from tire force. There is no closed form solution to the Pacejka equation for slip as the equation is not invertible. Hence, slip may be solved for iteratively as a function of tire force.

The known Pacejka equation is given by $$\text{TireForce} = D*\sin(b0*a\tan(\text{Slip}*B + E*(a\tan(\text{Slip}*B) - \text{Slip}*B)))$$

where D, B and E are calculated, as known in the art, from Pacejka parameters, and b0 is a Pacejka parameter. The Pacejka equation has no inverse for slip. From the above equation, one may write at least four equations to iterate. Testing has revealed, however, that only one of the four equations globally converges. The equation for slip is given by $$\text{Slip} = (\tan(1/b0*a\sin(\text{TireForce}/D)) - E*a\tan(\text{Slip}_1*B))/(B - E*B)$$

which may be iteratively solved until Slip converges within some threshold.

Figure 3:
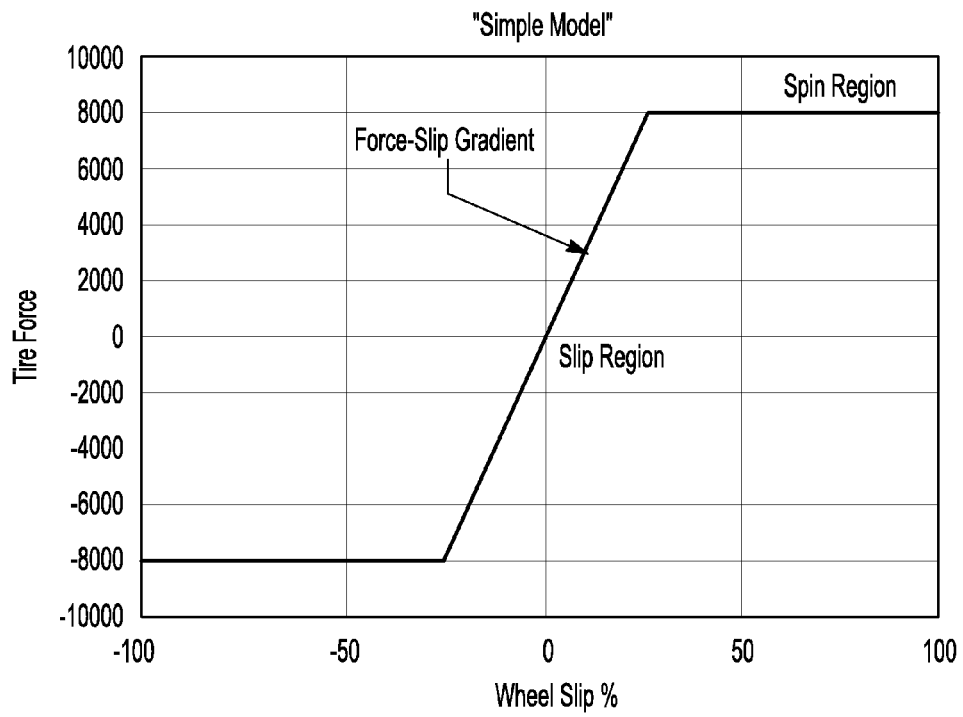
FIG. 3 is a plot of tire force versus wheel slip.

The tire simulation 30 may contain a wheel slip model, as illustrated in FIG. 3, that determines slip as a function of force. This model is representative of a simple model that may alternatively be replaced by any number of known/suitable tire models, such as a Pacejka tire model.

Test engineers may not have access to Pacejka parameters for wheel slip simulation. Certain implementations contemplated herein therefore use a simplified model similar to the one described above so that test engineers are able to define the simplified model based on track data. Previous solutions may have implemented a simple model by imposing a clamp on the drive demand to represent the maximum tire force and a gain factor representing slip for each tire. Such a solution, however, may not create slip as a function of force, and may result in loss of dynamometer control when the clamp is exceeded.

Figure 4:
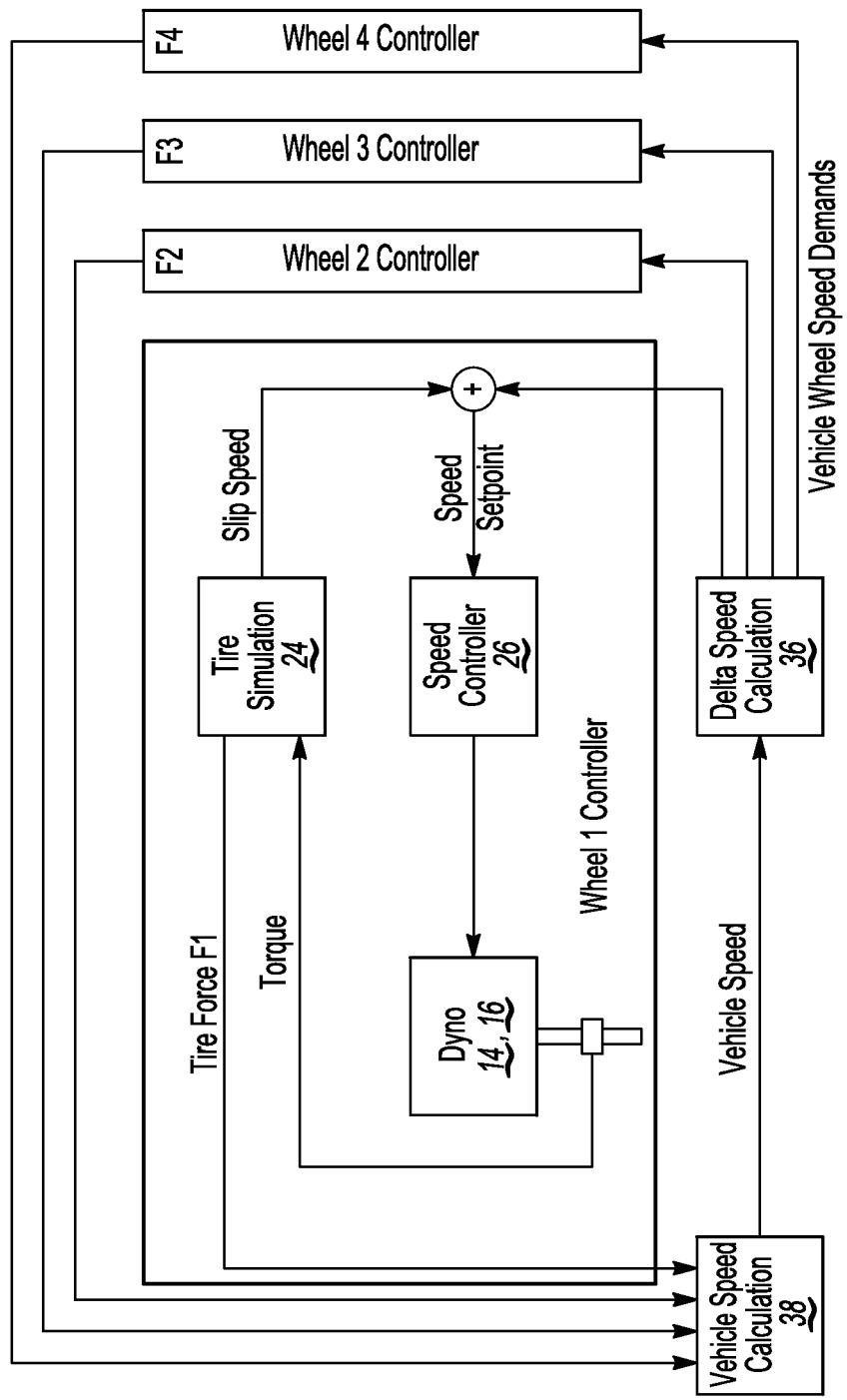
FIG. 4 is a block diagram of several wheel controllers.

FIG. 4 illustrates a simplified means to allow calculations for speed differences between tires (e.g., delta speed). For example, a 4 wheel drive vehicle negotiating a curve will experience different wheel speeds while maintaining a vehicle speed. The delta speed calculation block 36 is inserted between a vehicle speed calculation 38 and the wheel speed controller 26. The outputs of the delta speed calculation block 36 are the desired individual wheel speeds that are expected if there is no wheel slip (Wheel Speed Demand=Vehicle Speed+Delta Speed (i.e., the difference between the simulated wheel speeds due to, for example, road curvature, etc.)) By adjusting the delta speed using an external automation platform or simulation according to physical dimensions of the vehicle and steering angle, speed differences due to steering are accommodated. Hence, as discussed above delta speeds may be applied to mimic steering input to the vehicle speed, simplifying the steering calculation to a kinematic calculation. Alternatively, the actual calculations for steering angle input along with vehicle dimensions may provide an integrated solution that runs in the controller.

Referring again to FIG. 3, wheel slip is logically divided into two regions. The first (slip) region describes conditions in which the wheel slips based on a one-to-one function of slip and tire force. In this region, there is only one slip value for each value of tire force and vice-versa (commonly known as the slip region). The second (spin) region describes conditions in which there may be more than one value of slip for a given tire force (commonly known as the spin region). In the spin region, the acceleration of the tire is determined solely by the resulting force acting on the inertia of the tire. The tire speed due to this acceleration is calculable as described above.

Certain conventional techniques to simulate wheel slip require the dynamometer rotating inertia to equal the tire and wheel assembly rotating inertia. Furthermore, these techniques may effectively lose control of the wheel speed during a wheel spin event in the hope that the dynamometer will spin at a similar rate to that of the wheel because the inertias are the same. Such a system may preclude simulation of wheel rotating inertia via control techniques because by definition, one must have control of the dynamometer at all times to create the force necessary to simulate the rotating inertia. Systems/techniques/algorithms contemplated herein, however, may retain speed control of the dynamometer to ensure that the wheel accelerates so as to mimic the spinning tire and wheel on a vehicle in both the spin and slip regions.

Figure 5:
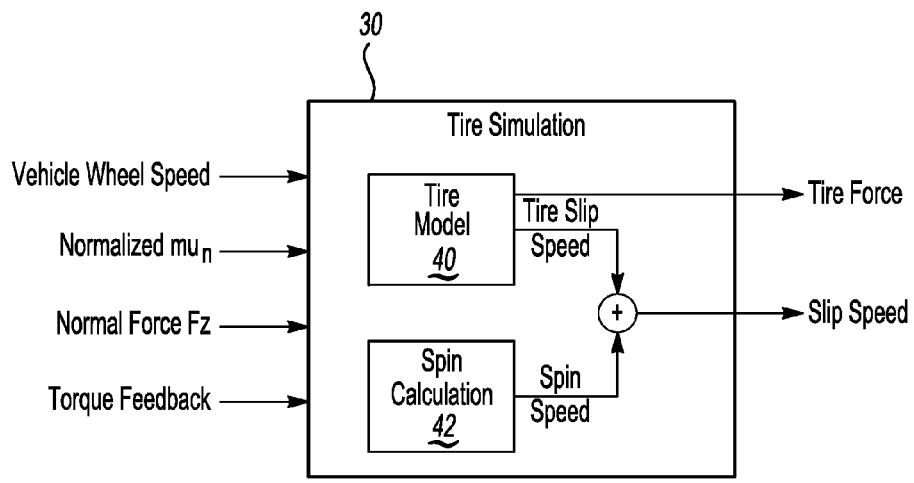
FIG. 5 is a block diagram of the tire simulation of FIG. 2.

Referring to FIG. 5, the tire simulation 30 may include two components: a tire model 40 that defines a tire slip speed and a spin calculation 42 (as discussed above) that defines the additional spin speed for the spin region. The tire model 40 (tire models are known in the art) may calculate the tire force as a function of the torque feedback, normalized mu, and normal force. The tire model 40 may then calculate slip as a function of tire force using an iterative approach or a simple tire model as described above. Any additional force from the torque feedback over and above the tire force may act to accelerate the tire and wheel assembly rotating inertia in the spin calculation 42. This calculation may enable proper control of the wheel speed during a spin event.

The algorithms disclosed herein may be deliverable to a processing device, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle wheel slip simulation system comprising:
a controller configured to receive speed and torque information about a dynamometer simulating a wheel-tire assembly slipping relative to a road surface, to determine a desired force and a desired speed of the simulated wheel-tire assembly based on the torque information, to determine a wheel slip based on the desired force, and to generate a demand for the dynamometer based on the speed information and the desired speed to cause the dynamometer to exhibit the desired force and desired rotating inertial characteristics, wherein determining the desired speed includes summing the wheel slip with a simulated speed representing a vehicle travelling on a road.

2. The system of claim 1 wherein the controller is further configured to determine the simulated speed representing a vehicle travelling on a road based on the desired force and a vehicle force.

3. The system of claim 1 wherein determining the wheel slip based on the desired force includes iteratively solving a mathematical model of the simulated tire.

4. The system of claim 1 wherein determining the wheel slip based on the desired force includes algebraically solving a mathematical model of the simulated tire.

5. A test system comprising:
a dynamometer configured to simulate the rotating inertial characteristics of a wheel-tire assembly slipping relative to a road surface, having rotating inertial characteristics different than the rotating inertial characteristics of the wheel-tire assembly being simulated, and including a drive, a motor and a controller configured to (i) receive speed and torque information about the motor, (ii) determine a desired force and a desired speed of the simulated wheel-tire assembly based on the torque information, (iii) determine a wheel slip based on the desired force, and (iv) generate a demand for the drive based on the speed information and the desired speed to cause the motor to exhibit the desired force and desired rotating inertial characteristics, wherein determining the desired speed includes summing the wheel slip with a simulated speed representing a vehicle travelling on a road.

6. The dynamometer of claim 5 wherein the controller is further configured to determine the simulated speed representing a vehicle travelling on a road based on the desired force and a vehicle force.

7. A non-transitory computer-readable storage medium having instructions stored thereon that when executed cause a processing device to receive speed and torque information about a dynamometer simulating a wheel-tire assembly slipping relative to a road surface, to determine a desired force and a desired speed of the simulated wheel-tire assembly based on the torque information, to determine a wheel slip based on the desired force, and to generate a demand for the dynamometer based on the speed information and the desired speed to cause the dynamometer to exhibit a desired force and desired rotating inertial characteristics, wherein determining the desired speed includes summing the wheel slip with a simulated speed representing a vehicle travelling on a road.

8. The non-transitory computer-readable storage medium of claim 7, wherein the instructions stored thereon, when executed, further cause a processing device to determine the simulated speed representing a vehicle travelling on a road based on the desired force and a vehicle force.

* * * * *